Sept. 30, 1969     J. S. HALL ET AL     3,470,507

EARTH-LEAKAGE SENSING CIRCUIT BREAKER

Filed Oct. 20, 1967     2 Sheets-Sheet 1

INVENTORS.
JOHN S. HALL
PETER E. G. CARPENTER
DAVID L. COOK

United States Patent Office 3,470,507
Patented Sept. 30, 1969

3,470,507
EARTH-LEAKAGE SENSING CIRCUIT BREAKER
John S. Hall, Highworth, Peter E. G. Carpenter, Newbury, and David L. Cook, Swindon, England, assignors to Square D Company, Park Ridge, Ill., a corporation of Michigan
Filed Oct. 20, 1967, Ser. No. 676,757
Claims priority, application Great Britain, Nov. 5, 1966, 49,692/66
Int. Cl. H01h 9/00
U.S. Cl. 335—174                            6 Claims

ABSTRACT OF THE DISCLOSURE

A molded case circuit breaker suitable for earth-leakage protection and arranged to be mounted in a panelboard has a sensitive double-latch mechanism which is operated by a relatively small solenoid disposed in a compartment also containing a pair of the circuit breaker contacts. A push-to-test switch is provided at the top of the circuit breaker housing.

---

This invention relates to circuit breakers of the earth- or ground-leakage sensing type usable for automatically isolating an electrical installation from the supply lines in the event a fault between a line conductor and the metalwork of the installation causes a hazardous potential difference between the metalwork and earth or ground, and more particularly to such a circuit breaker capable of being mounted in a panelboard or load center in substantially the same space as the usual main switch or main protective circuit breaker.

Heretofore, all known earth-leakage circuit breakers have been built as complete units which are mounted adjacent to load centers and not in them and therefore have had to be connected to the load centers by wires or cables. This results in a relatively costly installation. Further, the earth-leakage circuit breaker often duplicates some of the functions of the disconnect switch already fitted in the load center.

The earth-leakage circuit breaker of the present invention is relatively small and is contained in a molded case similar to the molded case of a conventional branch circuit protective circuit breaker with overall dimensions such that it can be mounted in a load center in alignment with the branch circuit protective circuit breakers.

A feature of the invention is the placement of the earth-leakage sensing means in a compartment of the housing also containing one pair of separable contacts. This is possible because the extreme sensitivity of an improved latch mechanism permits the earth-leakage sensing means to be very small.

The invention may be embodied in two, three, or four pole versions so that, upon detection of a fault, the live incoming supply lines as well as an incoming neutral line may be interrupted. A separate compartment is provided in the housing for each pair of the separable contacts.

An embodiment of the present invention will now be described, by way of example, with reference to the accompanying drawings, in which:

FIG. 3 is an enlarged elevation of a detail of FIG. 2 with a solenoid shown in section; and FIG. 4 is an end view of the detail of FIG. 3.

Figure 1:
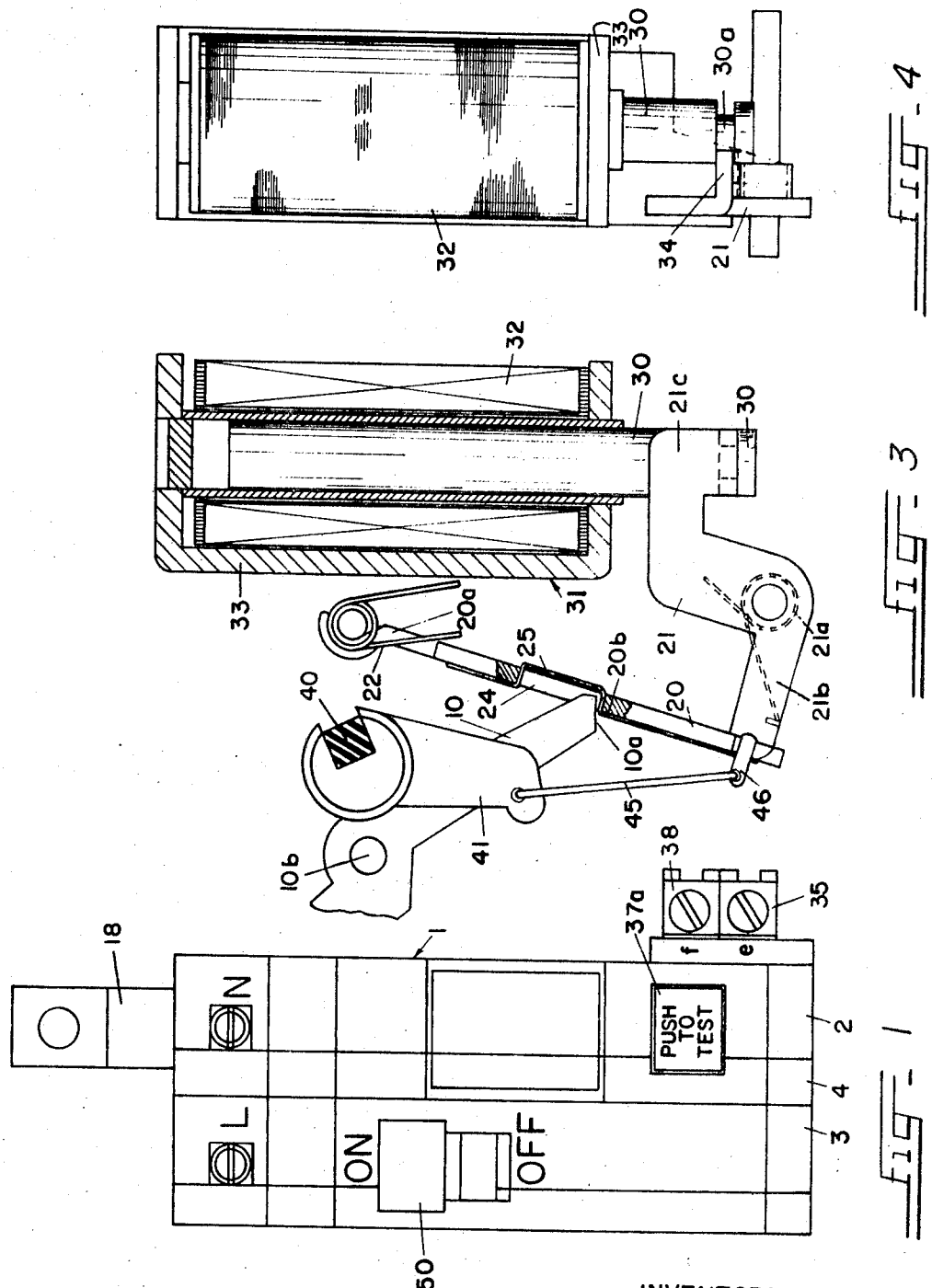
FIG. 1 is a top view of a two pole circuit breaker in accordance with this invention.

A two pole earth-leakage sensing circuit breaker embodying the invention is shown in the drawings and comprises a molded case 1 having an earth-leakage pole portion 2 and a live pole portion 3. Additional live pole portions may be provided as will become obvious. The earth-leakage pole portion 2 has a cover 4 which is removed in FIG. 2 exposing the inner mechanism of the earth-leakage pole portion.

Figure 2:
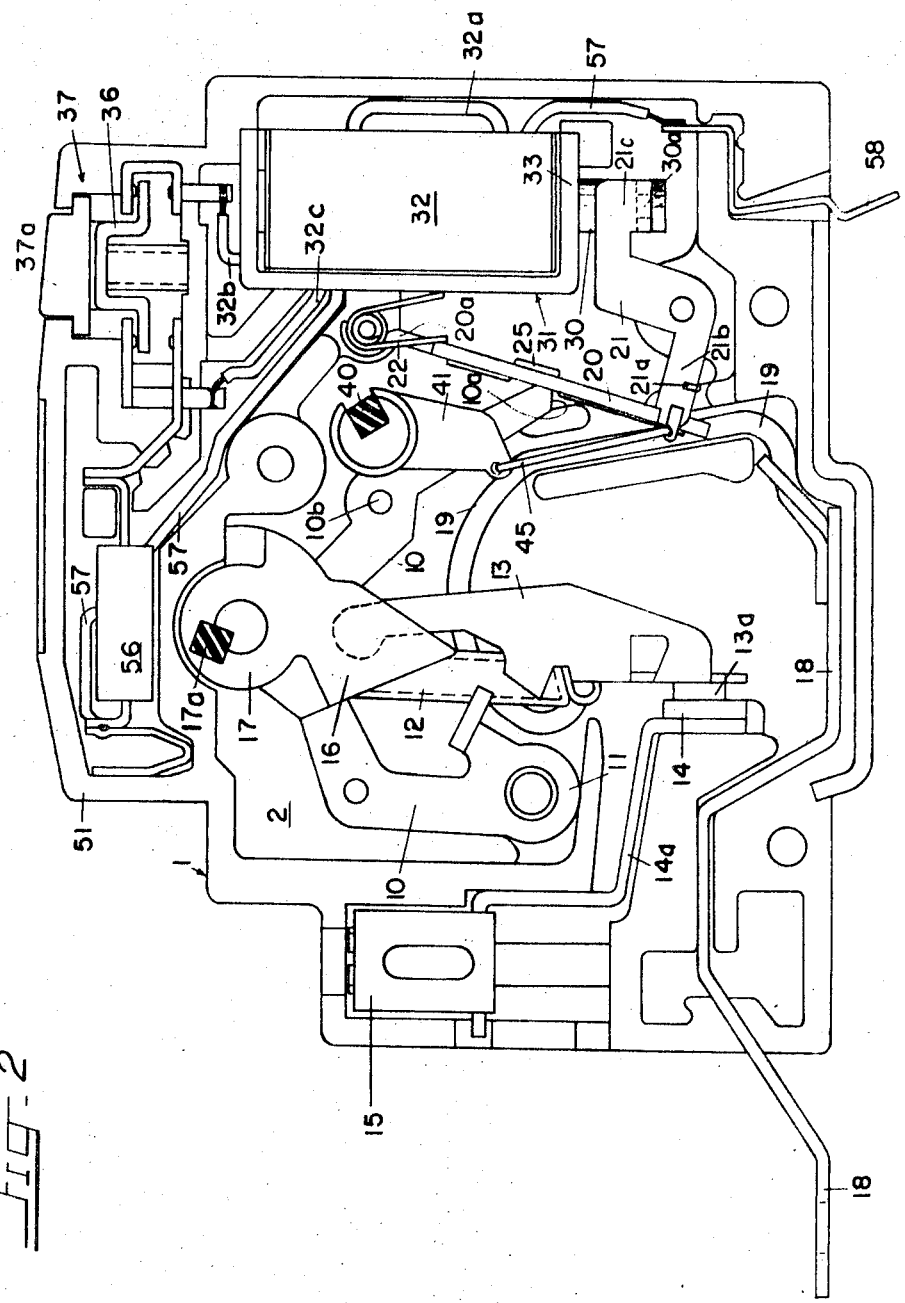
FIG. 2 is a side view of an earth-leakage pole portion of the two pole circuit breaker of FIG. 1 with a cover portion of the housing removed exposing the inner mechanism which is shown in the closed-circuit position.

Referring now to FIG. 2, a trip lever 10 of the earth-leakage pole portion 2 is pivotally mounted to the case 1 at one of its end portions 11 and is attached near its midpoint (not shown) to one end of an overcenter tension spring 12 which is attached at its other end to a movable contact carrier 13.

The contact carrier 13 at its free end portion is U-shaped and the bight thereof carries a movable contact 13a which cooperates with a stationary contact 14 electrically connected to a screw-type terminal member 15 by a terminal strap 14a. The other end portion of the contact carrier 13 is pivotally supported between a pair of downwardly extending leg portions 16 of a rocker 17 pivotally supported to the case 1. An elongated terminal member 18 extends through a slot in an end wall of the case 1 and lies along a lower wall thereof where it is connected to one end of a flexible connector 19 having its other end connected to the contact carrier 13.

A similar trip lever and associated contact structure is included in the live pole portion 3. The trip levers and associated contact structures of the respective pole portions 2 and 3 are generally like those shown in U.S. Patent No. 3,246,098 issued Apr. 12, 1966, and the live pole portion 3 includes a current responsive tripping means similar to that of the same patent. Each of the trip levers operates in response to operation of the other by a common trip means such as disclosed in U.S. Patent No. 2,889,428 issued June 2, 1959, and to which further reference will be made herein.

To ensure the required sensitivity, the latch mechanism of the tripping means in the earth-leakage pole portion 2 is a double-latch mechanism having both a primary latch lever 20 and a secondary latch lever 21. The trip lever 10 is held in the latched position shown in FIG. 2 by engagement of a latching surface 10a on the free end thereof wth the primary latch lever 20 which is pivoted at its upper end portion 20a to the case 1. A coil spring 22 surrounds the pivot for the latch lever 20 and urges the latch lever in a clockwise direction as viewed in FIGS. 2 and 3.

The trip lever 10, its associated overcenter spring 12, and the latch lever 20 are so arranged that the free end of the trip lever 10 bears against the latch lever 20 in a manner tending to swing the latch lever 20 counterclockwise about its pivot against the bias of the spring 22 by cam action away from obstructing relationship with the path of movement of the trip lever 10 toward its tripped position. To this end, the latching surface 10a on the free end of the trip lever 10 is disposed in a window 24 (FIG. 3) of the primary latch lever 20. A generally U-shaped latch plate 25 of thin metal with good wearing properties has its bight portion extending through the window 24 and has outwardly turned free end portions of its opposite leg portions secured on the side face 20b of the latch lever 20 facing the trip lever 10. The latch surface 10a of the trip lever 10 rests against a portion of the latch plate 25 overlying a corner defined by the side face 20b and a bottom wall of the window 24. The latch surface 10a is so inclined relative to the latch plate 25 and to the free end portion of the latch lever 20 that the overcenter spring 12 exerts a moment of force in a direction urging the latch lever 20 to swing away from the trip lever 10 in a counterclockwise direction as above noted. The trip lever 10 thus tends to free itself from engagement with the latch lever 20 and to reach the tripped position under the bias of the overcenter spring 12.

The secondary latch lever 21 normally prevents the trip lever 10 from moving to its tripped position by preventing movement of the primary latch lever 20 in the counterclockwise direction urged by the trip lever 10, and is in the form of a bell crank pivotally mounted to the case 1 and biased clockwise, as viewed in FIGS. 2 and 3, by a coil spring 21a. An inner free end portion 21b of the secondary latch lever 21 engages the free end portion of the primary latch lever 20 and prevents the primary latch lever 20 from moving out of engagement with the trip lever 10. An outer free end portion 21c of the secondary latch lever 21 is positioned to be engaged by a reciprocable armature or plunger 30 of an earth-leakage sensing solenoid 31. The axis of the solenoid 31 extends generally in the same direction as the longitudinal axis of the primary latch lever 20, and is disposed between the primary latch lever 20 and an end wall of the case 1. In addition to the plunger 30, the solenoid 31 comprises a coil 32 and a frame 33.

The coupling of the solenoid plunger 30 to the secondary latch lever 22 is accomplished by providing a tab 34 on the secondary latch lever 22 which engages an annular shoulder defined by a reduced diameter portion 30a of the plunger 30 as shown most clearly in FIG. 4.

The coil 32 is electrically connected at one end by a lead 32a to a terminal 35 (FIG. 1), also marked "e," which is adapted to be connected to earth, and at the other end through a lead 32b, a normally-closed bridging contact 36 of a test switch 37, and a lead 32c to a terminal 38 (FIG. 1), also marked "f," which is adapted to be connected to the metalwork of the installation to be protected.

Upon the coil 32 becoming sufficiently energized because of current flowing in the earth connection, the plunger 30 moves upwardly in engagement with the tab 34 of the secondary latch lever 21 to rotate the secondary latch lever 21 counterclockwise so as to free the primary latch lever 20 for counterclockwise movement which, in turn, frees the trip lever 10 causing snap action of the contact arm 13 in a counterclockwise direction to effect separation of all cooperating contacts of the circuit breaker as will now be explained.

Tripping of the trip lever of the live pole portion 3, in response to the sensing of a fault or an overload condition of the pole portion 3 by the current responsive tripping means thereof, causes the trip lever 10 to trip by coupling through the common trip means comprising a common trip crossbar 40 and a crank 41 carried thereby generally as in U.S. Patent No. 2,889,428. It will be understood that a crank similar to the crank 41 is also carried by the crossbar and is disposed in the live pole portion 3. A push rod 45 is pivotally attached at one end portion to the crank 41 and at the other end portion to an engaging projection 46 (FIG. 3) at the inner free end portion 21b of the secondary latch lever 21. The push rod 45 and the crank 41 are mutually inclined when in the untripped position to form a broken toggle. As the crank 41 turns in response to tripping action initiated at the live pole portion 3, the toggle straightens and the push rod 45 faces the secondary latch lever 21 away from the primary latch lever 20, resulting in the tripping of the trip lever 10 as explained hereinbefore.

Tripping of the trip lever 10 of the earth-leakage pole portion 2, in response to an excessive earth-leakage current, causes the trip lever in the live pole portion 3 to trip because the crank of the common trip means of that pole corresponding to the crank 41 directly engages the latch means of its associated current responsive means as in U.S. Patent No. 2,889,428. More specifically, as the upward movement of the plunger 30 causes the counterclockwise movement of the secondary latch lever 21 as explained hereinbefore, the push rod 45 is pulled downwardly to effect a straightening of the toggle formed by push rod 45 and the crank 41 thereby to turn the crank 41 counterclockwise. As the crank 41 turns, the common trip crossbar 40 of the common trip means causes the trip lever of the live pole portion 3 to release the latch thereof generally as in U.S. Patent No. 2,889,428. To ensure adequate counterclockwise rotation of the crank in the live pole portion 3, a pin such as the pin 10b projects perpendicularly from the trip lever thereof to engage the left-most surface of its associated common-trip crank to drive the crank still farther in its direction of angular movement thus insuring positive operation of the trip means in the earth-leakage pole portion 2.

Upon release of the plunger 30 by the interruption of current in the coil 32, the spring 21 drives the secondary latch lever 21 clockwise thereby to drive the common trip to its normal position.

A handle 50 integral with a rocker corresponding to the rocker 17 extends from the live pole portion 3 of the circuit breaker for effecting manual operation of the contacts and resetting or relatching of the circuit breaker as in Patent No. 3,246,098. The rocker integral with the handle 50 and the rocker 17 are tied for concurrent movement by a handle tie bar 17a. The protruding handle 50 is omitted in the compartment containing the earth-leakage pole portion 2 so that a test means for the earth-leakage sensing means can be provided in an exended upper portion 51 of that compartment.

The test means for the earth-leakage pole portion 2 comprises the push-button type switch 37 having a reciprocable push button 37a accessible from the top of the circuit breaker. When actuated, the switch 37 disconnects the terminal of the coil 32 connected to the lead 32b from the metalwork of an electrical installation by movement of the contact bridge 36 and connects it instead through a suitable resistor 56, a lead 57 and a terminal 58 to a supply line (not shown). This connection causes tripping of the circuit breaker if there is a proper electrical connection between the terminal of the coil 32 and the lead 32a to earth. Thus, the continuity of the solenoid circuit and the adequacy of the earth connection can be tested.

We claim:

1. An earth-leakage sensing circuit breaker comprising a molded case having a pair of side-by-side compartments, a pair of separable contacts in one of said compartments, a releasably latchable trip lever pivotally mounted in said one compartment, operating means in said one compartment operative to effect separation of the contacts upon release of the trip lever, a releasably latchable primary latch lever pivotally mounted in said one compartment, said primary latch lever normally releasably latching the trip lever and being movable in one direction to effect release of the trip lever, a magnetic tripping device in said one compartment including a magnetizable core, a coil magnetically associated with the core and connected in an energizing circuit, and an armature movable with respect to the core, a secondary latch lever pivotally mounted in said one compartment, said secondary latch lever normally releasably latching the primary latch lever and being movable in one direction to effect release of the primary latch lever upon flow of current in the energizing circuit and magnetic attraction of the armature, a circuit breaker mechanism in the other of said compartments, a common trip crossbar in said case extending between and into said compartments, a pair of crank members secured to the crossbar for rotation therewith and disposed respectively in said compartments, and a rod member disposed in said one compartment and operatively connected adjacent one end to said secondary latch lever and connected adjacent the other end to the crank member in said one compartment, said rod member being operative upon rotation of said crossbar and crank members to move said secondary latch lever out of latching relationship with said primary latch lever.

2. A circuit breaker as claimed in claim 1 wherein said coil is connected in a grounding circuit.

3. A circuit breaker as claimed in claim 1 including a spring in said one compartment biasing said secondary latch lever toward latching relationship with said primary latch lever.

4. A circuit breaker as claimed in claim 1 wherein the magnetic tripping device and the latch levers in said one compartment are aligned longitudinally of the case with the pair of separable contacts in said one compartment.

5. A circuit breaker as claimed in claim 1 wherein the magnetic tripping device is a solenoid, tht armature being a reciprocable plunger of the solenoid.

6. A circuit breaker as claimed in claim 1 including a pair of terminals mounted on said case, one of the terminals being for connection to earth and the other of the terminals being for connection to a metal frame of a device to be protected by the circuit breaker, and a switch in said one compartment having a normally closed contact and a normally open contact, the normally open contact closing upon opening of the normally closed contact, one end of said coil being electrically connected to said one terminal, the other end of said coil being electrically connected through the normally closed contact to said other terminal, and the normally open contact connecting said other end of the coil to a source of power upon opening of the normally closed contact and closing of the normally open contact.

References Cited

UNITED STATES PATENTS

| | | | |
|---|---|---|---|
| 2,895,028 | 7/1959 | Ellenberger | 335—35 |
| 3,246,098 | 4/1966 | Hall | 335—35 |

FOREIGN PATENTS 1,226,701 10/1966 Germany.

BERNARD A. GILHEANY, Primary Examiner

H. BROOME, Assistant Examiner